US011120586B2

(12) United States Patent
Bertoni Scarton et al.

(10) Patent No.: US 11,120,586 B2
(45) Date of Patent: Sep. 14, 2021

(54) VISUALIZING LINEAR ASSETS USING CLIENT-SIDE PROCESSING

(71) Applicant: International Business Machines Corporation, Armonk, NY (US)

(72) Inventors: Tiago Bertoni Scarton, São Paulo (BR); Thiago Bianchi, São Carlos (BR); Joao Souto Maior, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/654,091

(22) Filed: Oct. 16, 2019

(65) Prior Publication Data

US 2020/0051292 A1  Feb. 13, 2020

Related U.S. Application Data

(63) Continuation of application No. 15/717,061, filed on Sep. 27, 2017, now Pat. No. 10,593,075.

(51) Int. Cl.
*G06T 11/00* (2006.01)
*G06T 11/20* (2006.01)
*G06T 7/60* (2017.01)
*G06Q 10/06* (2012.01)

(52) U.S. Cl.
CPC ........ *G06T 11/203* (2013.01); *G06Q 10/0631* (2013.01); *G06T 7/60* (2013.01); *G06T 11/206* (2013.01); *G06T 2210/04* (2013.01)

(58) Field of Classification Search
CPC ............... G06T 11/203; G06T 11/00

USPC .................................................. 345/443, 419
See application file for complete search history.

(56) References Cited

U.S. PATENT DOCUMENTS

| 8,589,256 | B2 | 11/2013 | Dwight et al. |
| 10,210,285 | B2 | 2/2019 | Wong et al. |
| 2008/0062167 | A1* | 3/2008 | Boggs ..................... G06T 19/00 345/419 |
| 2010/0064242 | A1 | 3/2010 | Dwight et al. |
| 2013/0218890 | A1 | 8/2013 | Conal et al. |
| 2014/0026089 | A1 | 1/2014 | Niel et al. |

(Continued)

OTHER PUBLICATIONS

IBM, suse.com, copyright 2017, IBM Maximo Linear Asset Manager 7.1, Retrieved from Internet: URL: https://www.suse.com/susePSC/viewVersionPage?versionId=15179, 1 page.

(Continued)

*Primary Examiner* — Thomas J Lett
(74) *Attorney, Agent, or Firm* — Schmeiser, Olsen & Watts, LLP; Nicholas L. Cadmus

(57) ABSTRACT

A linear asset processing and managing system and method may include receiving a plurality of metrics associated with a linear asset segment from an asset management system over a network, in response to a request by the computing system to the asset management system, calculating an intermediate point on the geospatial context using a geometric analytic tool that analyzes the plurality of metrics received from the asset management system, determining a geospatial length of the linear asset segment, using the intermediate point and at least one metric of the plurality of metrics, and displaying the linear asset segment of the linear asset on the geospatial context.

20 Claims, 7 Drawing Sheets

(56) References Cited

U.S. PATENT DOCUMENTS

2014/0214801 A1    7/2014   Ciliberti, III
2016/0125335 A1    5/2016   Cheng
2019/0096099 A1    3/2019   Bertoni Scarton et al.

OTHER PUBLICATIONS

Tristan Ogorman, Linear Asset Manager, IBM developer works, Updated May 20, 2013, Retrieved from Internet: URL:https://www.ibm.com/developerworks/community/wikis/home?lang=en#!/wiki/IBM+Maximo+Asset+Management/page/Maximo+Linear, 2 pages.
Oracle, copyright 2016, Overview of Linear Asset Management, Retrieved from Internet: URL: https://docs.oracle.com/cd/E26401_01/doc.122/e48789/T259967T632708.htm, 14 pages.
DOI 10.11606/D.55.2013.tde-23072013-164457; Documento Dissertação de Mestrado; Autor Bianchi, Thiago (Catálogo USP); Nome completo Thiago Bianchi; E-mail E-mail; Unidade da USP Instituto de Ciências Matemáticas e de Computação Área do Conhecimento Ciências de Computação e Matemática Computacional Data de Defesa Jun. 10, 2013; Imprenta São Carlos, 2013, 2 pages.
JavaScript; From Wikipedia, the free encyclopedia, 19 pages.
Linear Assets Map Integration, Oracle Enterprise Asset Management User's Guide, Release 12.2, Part No. E48789-06, Copyright © 2001, 2016, 5 pages.
Office Action (dated Dec. 31, 2018) for U.S. Appl. No. 15/717,061, filed Sep. 27, 2017.
Amendment (dated Apr. 1, 2019) for U.S. Appl. No. 15/717,061, filed Sep. 27, 2017.
Notice of Allowance (dated Aug. 1, 2019) for U.S. Appl. No. 15/717,061, filed Sep. 27, 2017.

\* cited by examiner

VISUALIZING LINEAR ASSETS USING CLIENT-SIDE PROCESSING

This application is a continuation application claiming priority to Ser. No. 15/717,061, filed Sep. 27, 2017, now U.S. Pat. No. 10,593,075 issued Mar. 17, 2020.

TECHNICAL FIELD

The present invention relates to systems and methods for visualizing linear assets on a geospatial context, and more specifically the embodiments of a linear asset processing system for displaying a linear asset on a map using client-side processing.

BACKGROUND

Enterprise Asset Management Systems (EAM) integrated with Geographic Information Systems (GIS) can be used to provide a spatial view of infrastructure sites.

SUMMARY

An embodiment of the present invention relates to a method, and associated computer system and computer program product, for visualizing a linear asset in a geospatial context. A processor of a computing system receives a plurality of metrics associated with a linear asset segment from an asset management system over a network, in response to a request by the computing system to the asset management system. An intermediate point on the geospatial context is calculated using a geometric analytic tool that analyzes the plurality of metrics received from the asset management system. A geospatial length of the linear asset segment is determined using the intermediate point and at least one metric of the plurality of metrics. The linear asset segment of the linear asset is displayed on the geospatial context.

DETAILED DESCRIPTION

Figure 1:
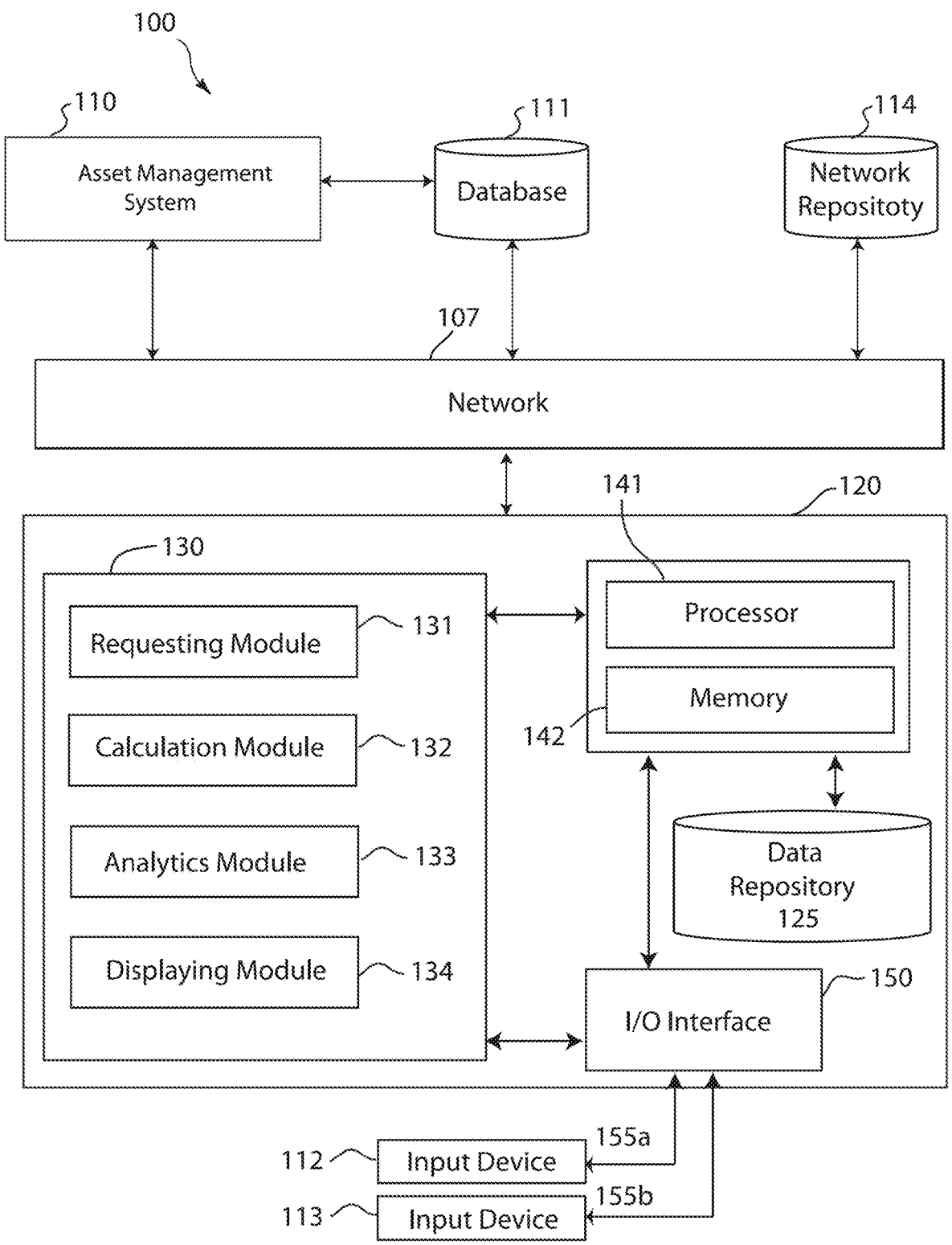
FIG. 1 depicts a block diagram of linear asset processing system, in accordance with embodiments of the present invention.

EAM systems are a specific type of Enterprise Resource Planning (ERP) that is characterized to have functionalities designed to support management activities of large scale assets, such as trucks, turbines, oil platforms, and nuclear reactors. EAM systems cover subjects including the design, construction, commissioning, operations, maintenance and decommissioning/replacement of plant, equipment and facilities. Furthermore, EAM systems may be a comprehensive solution for managing physical assets on a common platform in asset-intensive industries. For example, EAM systems may offer built in mobile access, out-of-the box mapping, crew management and analytical insight. EAM allows organizations to share and enforce best practices, inventory, resources and personnel, and helps manage all types of assets including plant, production, infrastructure, facilities, transportation, and communication.

Moreover, EAM systems may have a GIS integration component that includes a toolbar in a desktop and/or mobile GIS to keep assets in sync between the GIS and the EAM, which may also use server-based GIS to give a spatial view of assets and work orders. GIS is a collection of computer hardware, software and geographic data for capturing, managing, analyzing and displaying every form of geographically referenced information, often called spatial data. In other words, a GIS may be computer system capable of assembling, storing, manipulating, and displaying geographically referenced information (i.e. data identified according to their locations). GIS technology integrates common database operations such as query and statistical analysis with the unique visualization and geographic analysis benefits offered by maps. Through the usage of such functionalities, the GIS user is capable to manipulate data defined in terms of points, lines, and areas to retrieve relevant information using ad hoc queries and analyses. In this way, a GIS can locate the exact position of an infrastructure such as valves, hydrants, meters, roads and railways, displaying them on a computerized map. With the use of GIS in asset management applications, it is possible to visualize and understand a geographical context of an asset and improve an efficiency of asset management. Therefore, the way EAM systems are integrated with GIS underscores the concept that enterprise asset management is about utilizing the best information from each system that stores data about assets.

In this context, various EAM systems allow users to view data through creation of asset and location hierarchies. Additionally, the user can navigate on this hierarchy using a drill down functionality to see where each asset lies in the hierarchy, and display the details for any given component in a form or table window. Some EAM platforms support the ability to define linear assets, which added length as a new dimension that delivers the capability to manage linear assets, such as roads, railways, pipelines, gas lines, electrical conduits, drains, etc. Unfortunately, current EAM platforms supporting linear assets do not have a mechanism to integrate data and map visualization. Without data and map visualization, the benefits from GIS cannot be applied to linear assets Embodiments of the present invention may enable linear assets visualization, allowing a user to use an analytical power of GIS in order to gain a better understanding of how linear assets are performing and how the linear assets affect an assets' level of service. Further embodiments may include a map capability, which is a mechanism to visualize, analyze and explore many pieces of asset related data and also enable a capability to propose new ways to better manage linear assets. Thus, embodiments of present invention may be a method, computer system, and computer program product to render a targeted linear segment of a linear asset on a computerized map using only client-side processing that enables EAM customers to have the benefits of GIS functionalities to manage linear assets. In some embodiment, there may be no need to store geographic coordinates because the map rendering is calculated based on the measurement data already stored on the EAM server(s). A client-side algorithm may be used to create one or more linear segments along the linear assets projected onto a computerized map or a geospatial context. Software code may be developed to implement a lightweight process on the client-side, which results in a significant performance gain compared to the EAM systems that needs to request data to another piece of software that is on the server-side, and in some cases, need to request data that is stored in a database.

There is also an advantage related to less network traffic that is generated with the client-side processing, due the fact there is no need to make server side requests to get more data to be displayed on the map. Another advantage to the client-side processing in accordance with embodiments of the present invention is that the proposed method can be leveraged by applications that are being executed in mobile devices, even when the applications are in offline/disconnected mode. For asset-intensive and highly regulated industries such as railway, roadway, oil and gas, and utilities, using a top/down or hierarchical approach to manage linear assets is a difficult and complex process. The critical infrastructure in these industries requires a different view and approach than what is typically supported by most asset management systems. Unlike the assets found in a facility, plant or fleet, linear assets have unique requirements that demands a unique asset management/processing approach, which may be referred to as continuous or linear asset management. Having the linear asset data in a geospatial context allows a user to view, understand, question, interpret, and visualize this data in ways that reveal relationships, patterns, and trends in the form of maps, globes, reports, and charts. This combination helps to answer questions and solve problems by looking at the data in a way that is quickly understood and easily shared on a geospatial context, such as a computerized map. Embodiments of the present invention may bring to the Asset Management Industry the ability to visualize linear assets on geospatial context, using the start and end measures of each asset segment and a set of map points to position those segments. Moreover, embodiments of the present invention may be implemented on Javascript as the client side platform, Referring to the drawings, FIG. 1 depicts a block diagram of linear asset processing system 100, in accordance with embodiments of the present invention. Embodiments of the linear asset processing system 100 may be a system for processing a section of a linear asset and displaying the section of the linear asset in a geospatial content, such as a computerized map, using client-side processing. Embodiments of the linear asset processing system 100 may be useful for visualizing linear assets on a computerized map depicting an environment with other physical landmarks, utilities, facilities, linear assets, bodies of water, etc. Embodiments of the environment may be a venue, a location, a city, a neighborhood, a district, a shopping center, a warehouse, a factory, a power generation facility, a building, a school, a campus, a hospital, a base camp, an airport, a train station, a stadium, and the like.

Embodiments of the linear asset processing system 100 may be a linear asset management system, a visualization system, a liner asset visualization system, an asset management system, a linear asset mapping platform, and the like. Embodiments of the linear asset processing system 100 may include a computing system 120. Embodiments of the computing system 120 may be a client device, such as a computer system, a computer, a cellular phone, a user mobile device, a user computing device, a tablet computer, a dedicated mobile device, a laptop computer, desktop computer, other internet accessible device or hardware and the like. Embodiments of the computing system 120 may include hardware functionality such as a display for displaying a linear asset segment over a computerized map, wherein the display may be a touchscreen display capable of interaction by the user.

Furthermore, embodiments of linear asset processing system 100 may include an asset management system 110 and at least one server 111 coupled to the asset management system 1110. The asset management system 110 and potentially the server 111 may be communicatively coupled to the computing system 120 of the linear asset processing system 100 over a computer network 107. For instance, information/data may be transmitted to and/or received from the asset management system 110 and/or server 111 over a network 107. A computer network 107 may be the cloud. Further embodiments of computer network 107 may refer to a group of two or more computer systems linked together. Computer network 107 may be any type of computer network known by individuals skilled in the art. Examples of computer network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the computer network 107 may be a peer-to-peer network in some embodiments, wherein in other embodiments, the computer network 107 may be organized as a client/server architecture.

In some embodiments, the computer network 107 may further comprise, in addition to the computing system 120, a connection to one or more network-accessible knowledge bases 114, which are network repositories containing asset data, geospatial information, user queries, work order information etc., network repositories or other systems connected to the computer network 107 that may be considered nodes of the computer network 107. In some embodiments, where the computing system 120 or network repositories allocate resources to be used by the other nodes of the computer network 107, the computing system 120 and network-accessible knowledge bases 114 may be referred to as servers.

The network-accessible knowledge bases 114 may be a data collection area on the computer network 107 which may back up and save all the data transmitted back and forth between the nodes of the computer network 107. For example, the network repository may be a data center saving and cataloging user activity data, user data, location data, user preference data, and the like, to generate both historical and predictive reports regarding a particular user or a user's message preference, and the like. In some embodiments, a data collection center housing the network-accessible knowledge bases 114 may include an analytic module capable of analyzing each piece of data being stored by the network-accessible knowledge bases 114. Further, the computing system 120 may be integrated with or as a part of the data collection center housing the network-accessible knowledge bases 114. In some alternative embodiments, the network-accessible knowledge bases 114 may be a local repository that is connected to the computing system 120.

Embodiments of the asset management system 110 may be an EAM system/platform for managing physical assets on a common platform in asset-intensive industries, as described above. The asset management system 110 may be coupled to a server 111 that may be a repository, database, storage device, and/or may service requests received by the asset management system 110 or the computing system 120 directly. The combination or individually, the asset management system 110 and the server 111 may include vast amounts of data specific to assets in an environment. Asset data may include specifications, a distance a particular asset extends in the physical world, physical capacities of linear assets, layouts of linear assets, dimensions, usage, attributes of linear assets, parameters of linear assets, geographical data, location data of linear assets, and the like. Embodiments of the computing system 120 may communicate with the asset management system 110 and/or server 111 to request data associated with a linear asset, as will be described in greater detail infra.

Embodiments of the computing system 120 may also include an I/O interface 150. For instance, one or more input devices 112, 113 may be connected via an I/O interface 150 to computer system 120. The number of input devices 112, 113 connecting to computer system 120 via data bus lines 155a, 155b (referred to collectively as "data bus lines 155) may vary from embodiment to embodiment, depending, for example, on the number of peripheral devices coupled to the computer system 120, if any. An I/O interface 150 may refer to any communication process performed between the computer system 120 and the environment outside of the computer system 120, for example, the input devices 112, 113. Input to the computing system 120 may refer to the signals or instructions sent to the computing system 120, while output may refer to the signals sent out from the computer system 120 to the input devices 112, 113. Alternatively, one or more input devices, such as input devices 112, 113, may be communicatively coupled to the computing system 120 over computer network 107. Embodiments of the input device 112, 113 may include a sensor, a mouse, a keyboard, a camera, an external hard drive, a printer, or any other peripheral device.

Furthermore, embodiments of the computing system 120 may be equipped with a memory device 142 which may store various data/information/code, and a processor 141 for implementing the tasks associated with the linear asset processing system 100. In some embodiments, a linear asset processing application 130 may be loaded in the memory device 142 of the computing system 120. The computing system 120 may further include an operating system, which can be a computer program for controlling an operation of the computing system 120, wherein applications loaded onto the computing system 120 may run on top of the operating system to provide various functions. Furthermore, embodiments of computing system 120 may include the linear asset processing application 130. Embodiments of the linear asset processing application 130 may be an interface, an application, a program, a module, or a combination of modules. In an exemplary embodiment, the linear asset processing application 130 may be a software running on the client-side computing, such as a desktop computer, laptop computer, mobile device, tablet computer, etc., of a user.

The linear asset processing application 130 of the computing system 120 may include a requesting module 131, a calculation module 132, an analytics module 133, and an displaying module 134. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the requesting module 131 may include one or more components of hardware and/or software program code for receiving a plurality of metrics associated with a linear asset segment from an asset management system 110 over a network 107, in response to a request by the computing system 120 to the asset management system 110. For instance, embodiments of the requesting module 131 may request metrics (e.g. asset-specific data) from the asset management system 110 for a given linear asset. Embodiments of the plurality of metrics may include a starting point of the linear asset, an ending point of the linear asset, an overall length of the linear asset, a targeted section of the linear asset, and the like. The metrics may be geographical positions, such as a latitude or longitude, and may also be physical dimensions, such as an overall length of a linear asset, and/or a length of a targeted section of a linear asset after filtering by one or more parameter. For example, a user may select a location on a map displayed on the touchscreen of the computing system to indicate a geographic location on a map, wherein the asset management system 110 may in response transmit the latitude and longitude coordinates of the location selected by the user. In an exemplary embodiment, a user may touch a point on the map displayed on the computing system 120 to indicate a starting position of a linear asset for calculation, and the asset management system 110 may return the coordinates to the starting point. The metrics may also be asset-specific data, such as an overall length of a liner asset as the linear asset exists in the real world (e.g. road A extends for 500 miles). Further, the metrics may include results filtered by the asset management system 110 based on one or more inputs from a user operating the computing system 120. For example, the request transmitted by the requesting module 131 may include one or more parameters input by user, which returns a result based on the parameters. Examples of parameters may include attributes, regulations, laws, capacities, maximum and minimum tolerances, usage rates, flow rates, maintenance records, and the like, associated with a linear asset. The parameters input by the user may affect the metrics returned from the asset management system 110.

Figure 2:
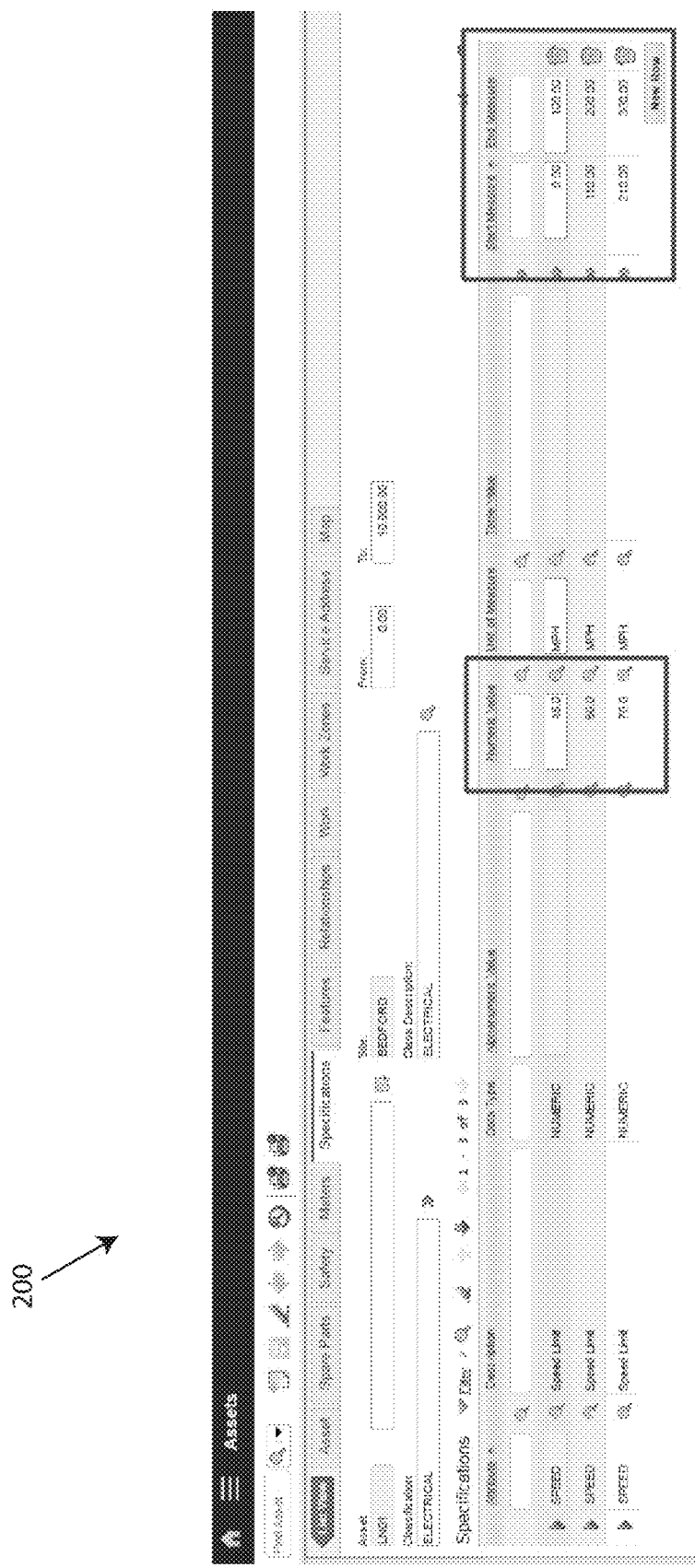
FIG. 2 depicts a metrics table view, in accordance with embodiments of the present invention.

FIG. 2 depicts a metrics table view 200, in accordance with embodiments of the present invention. Embodiments of the metrics table view 200 may include a data table having various data input options and results from a request for metrics. The requesting module 131 may transmit a request to the asset management system 110 in response to a user inputting various data into a metric table 200. In an exemplary embodiment, a user desires to use the linear asset processing application 130 to visualize which segments of a particular road has a speed limit of 45 mph, and create work orders for those segments of the road. Thus, the user has selected an attribute of "speed" or "speed limit as a parameter to filter metric data returned to the computing system 120, and enters "45" in the metric table 200. The user also selects on a map a starting point of the particular road. The requesting module 131 sends the request(s) and in response receives metric data including the geographical coordinates of the starting point of the particular road, as well as an ending point for the portion of the road that fits within or corresponds to the parameter input by the user (e.g. 45 mph speed limit). As shown in FIG. 2, metric data for a targeted section of a linear asset, or a linear asset segment, is provided. The user may also further filter the particular linear asset into multiple targeted sections, by inputting a 50 mph speed limit parameter and a 70 mph parameter, which return a different ending point and starting point.

Accordingly, the requesting module 131 may send out one or more requests to the asset management system 110 for metric data in accordance with one or more parameters, and receives the plurality of metrics associated with the linear asset.

Referring back to FIG. 1, embodiments of the computing system 120 may further include a calculation module 132. Embodiments of the calculation module 132 may include one or more components of hardware and/or software program code for calculating an intermediate point L(x,y) on the geospatial context using a geometric analytic tool that analyzes the plurality of metrics received from the asset management system 110. For instance, embodiments of the calculation module 132 may utilize the starting point P1 (i.e. geographic coordinates on a map), an ending point P2 (i.e. geographic coordinates on a map), an overall line length h, and a length of a targeted section m, to calculate a geospatial position of the intermediate point L(x,y).

Figure 3:
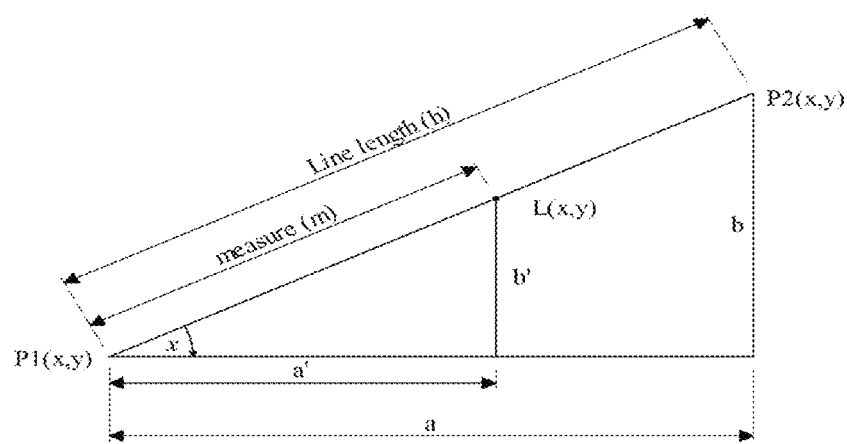
FIG. 3 depicts an exemplary calculation graph, in accordance with embodiments of the present invention.

FIG. 3 depicts an exemplary calculation graph, in accordance with embodiments of the present invention. Embodiments of the calculation module 132 may utilize a geometric analytics tool to calculate a value or result for the intermediate point, L(x,y). The intermediate point L(x,y) can be calculated because the metrics received by the requesting module 131 include known values to be used by the geometric analytic tool applying a plurality of mathematical functions to arrive at the unknown variables. For example, the geometric analytical tool may utilize a plurality of mathematical functions to determine the intermediate point L(x,y), the intermediate point L(x,y) being defined as a combination of a function of an X axis L(x) and a function of a Y axis L(y). Embodiments of the geometric analytics tools may calculate L(x) using the following formula:

$$L(x)=P1(x)+a', \text{wherein:}$$

$a=P2(x)-P1(x)$,
$\cos(x)=a/h$, and
$a'=\cos(x)*m$.

"P1(x)" is a starting point coordinate in an X axis, "P2(x)" is an end point coordinate in the X axis, "a" is a total length/distance along the X axis, "x" is an angle, and "a'" is a total length/distance along the X axis to the intermediate point L(x,y). Embodiments of the geometric analytics tools may calculate L(y) using the following formula:

$$L(y)=P1(y)+b', \text{wherein:}$$

$b=P2(y)-P1(y)$,
$\sin(x)=b/h$, and
$b'=\sin(x)*m$.

"P1(y)" is a starting point coordinate in an Y axis, "P2(y)" is an end point coordinate in the Y axis, "b" is a total length/distance along the Y axis, "x" is an angle, and "b'" is a total length/distance along the Y axis to the intermediate point L(x,y).

The calculations performed by the calculation module 132 may run only on the client-side, which makes the calculation even faster once it is not necessary to waste time on round-trips calls to the asset management system 110 and/or server 111 (e.g. client-server arrangement). Because the linear asset protection application 130 uses mathematical functions to calculate a distance for each segment, it is possible to use the results with any map provider.

Referring back to FIG. 1, embodiments of the computing system 120 may also include an analytics module 133. Embodiments of the analytics module 133 may include one or more components of hardware and/or software program code for determining a geospatial length of the linear asset segment, using the intermediate point and at least one metric of the plurality of metrics. For instance, the analytics module 133 may analyze the coordinates for the starting point (e.g. at least one metric) and the coordinates for the intermediate point calculated by the calculation module 132, to determine a geospatial length of a linear segment of the linear asset, which extends between the starting point P1 (x,y) and intermediate point L(x,y). In an exemplary embodiment, the geospatial length of the linear asset segment may a distance, such as miles in the physical world. Embodiments of the linear asset segment may be a targeted section of the linear asset being evaluated or otherwise examined by the user, which is the distance between the starting point P1(x,y) and intermediate point L(x,y) and will eventually be displayed on the a computerized map on the computing system 120. Thus, embodiments of the analytics module 133 may determine, on the client-side, a proper position and a length of the linear asset segment on the geospatial context.

Figure 4:
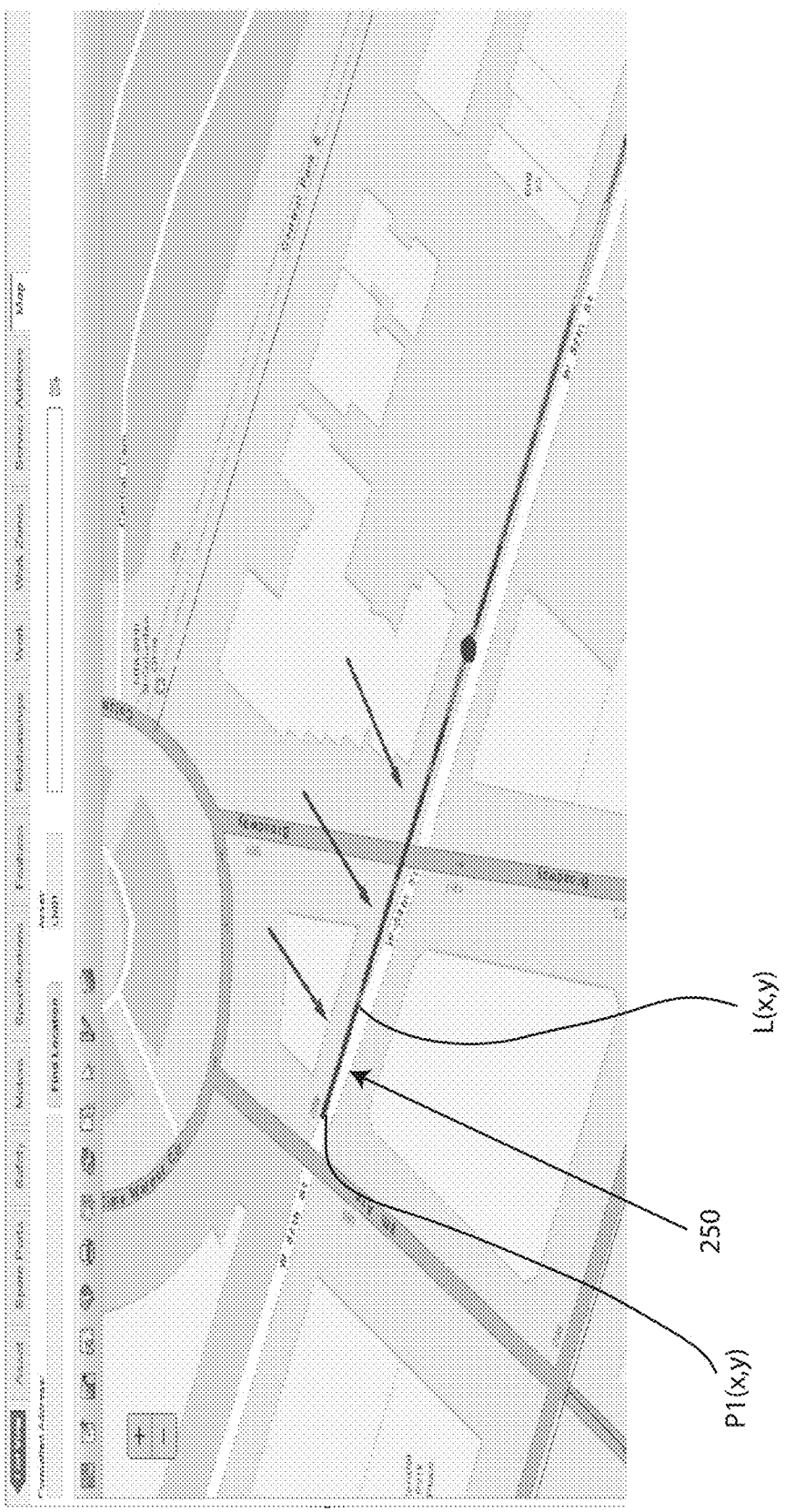
FIG. 4 depicts a linear asset segment displayed on a map, in accordance with embodiments of the present invention.

Embodiments of the computing system 120 may also include a displaying module 134. Embodiments of the displaying module 134 may include one or more components of hardware and/or software program code for displaying the linear asset segment of the linear asset on the geospatial context. For instance, embodiments of the displaying module 134 may display or otherwise present the linear asset segment on a computerized map so that the user can visualize the targeted or selected linear asset section on a map. Embodiments of the displaying module 134 may render a line segment between a starting point P1(x,y) of the linear asset and the intermediate point L(x,y) on the geospatial context, the geospatial context being a map showing an environment selected by the user. The rendered line segment may allow a user to visualize the linear asset after applying one or more parameters to filter the linear asset in customizable way by the user. FIG. 4 depicts a linear asset segment displayed on a map, in accordance with embodiments of the present invention. As shown in FIG. 4, embodiments of the displaying module 134 rendered a visible line segment 250 to represent a linear asset segment of a linear asset. Thus, the linear asset segment can be visualized by a user in a convenient manner, which also shows a proximity of other structures, waterways, roads, pipes, etc. to the linear asset segment, in a single display. Moreover, embodiments of the displaying module 134 may display multiple line asset segments on the same map. The multiple line asset segments may be referred to the same linear asset, only with a slightly different parameter set (e.g. a road having zones of varying speed limits of 45 mph, 50 mph, and 70 mph). Alternatively, the multiple line asset segments displayed by the displaying module 134 may be related to separate linear assets (e.g. a road and a gas line).

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, embodiments of the linear asset processing system 100 may improve asset management technology by offering a method to filter linear assets based on one or more parameters to effectively display a segment of the linear asset alongside other objects in a geospatial context. Thus, the linear asset processing system 100 may be individualized to each linear asset in an asset management system and then further to each user/user device, which is being used to process the calculating, determining, and displaying, for visualizing the linear asset segment.

Furthermore, the linear asset processing system 100 improves computer technology by saving computing power resources. Performing the calculating, determining, and displaying uses power and other computing resources of an enterprise server of an EAM system. The claimed solution is necessarily rooted in computer technology in order to overcome a problem specifically arising in the realm of computer technology. By reducing and/or offloading the processing power demand typically required by the EAM server(s) and instead relying on a client-side processing as described above, there is a savings in the computing resources used for the EAM servers, as well as an increase in performance/speed due to the client-side processing of the visualization of the linear asset segment on the local client device. Thus, in some embodiments, there is an improvement to the computing device/systems overall, because the linear asset processing system 100 may be directed to an improvement to computer technology, including software that improves the capability of an EAM system.

Figure 5:
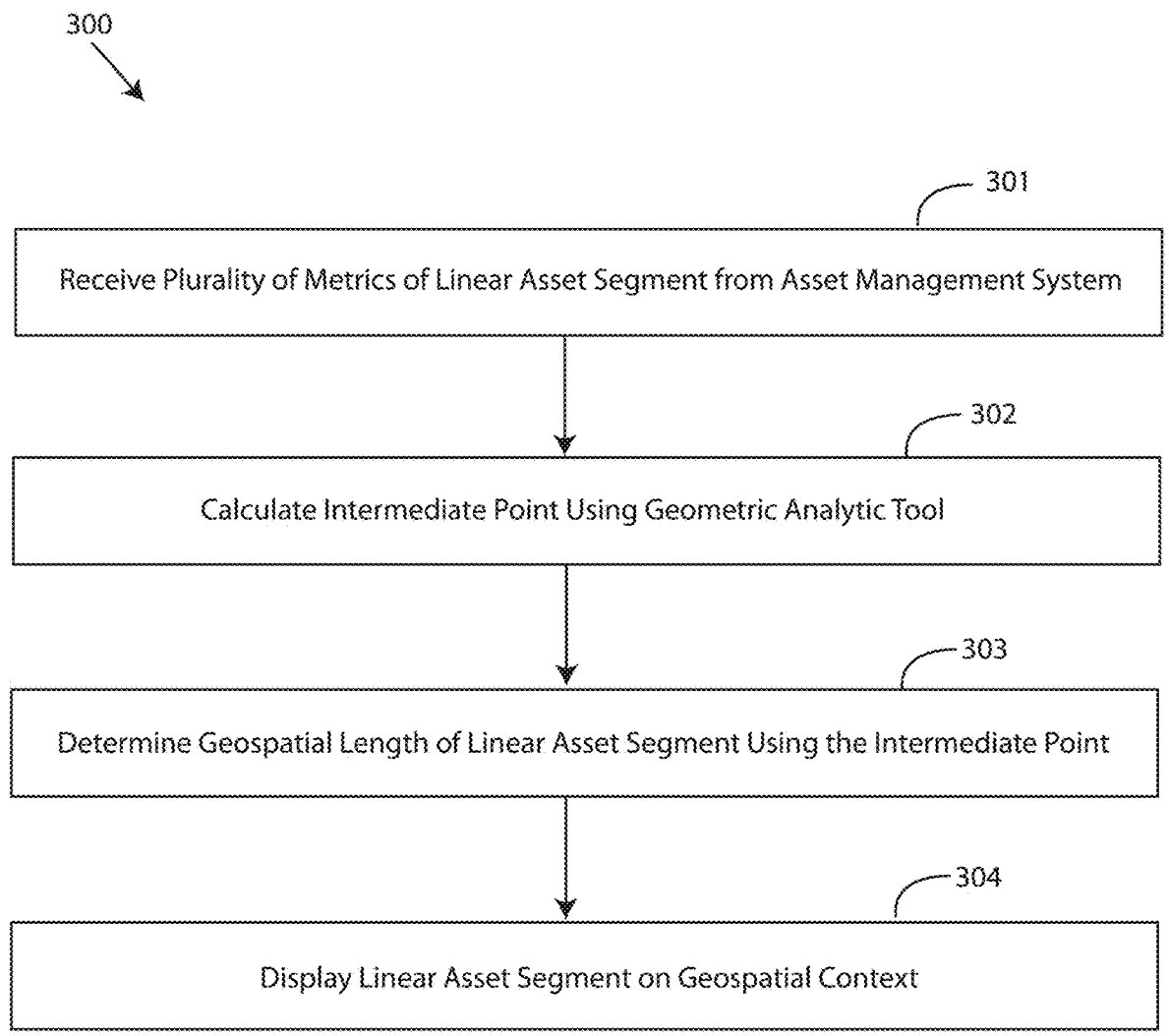
FIG. 5 depicts a flow chart of a method for visualizing a linear asset on a geospatial context, in accordance with embodiments of the present invention.

Referring now to FIG. 5, which depicts a flow chart of a method 300 for visualizing a linear asset on a geospatial context, in accordance with embodiments of the present invention. One embodiment of a method 300 or algorithm that may be implemented for visualizing a linear asset on a geospatial context with the linear asset processing system 100 described in FIGS. 1-4 using one or more computer systems as defined generically in FIG. 7 below, and more specifically by the specific embodiments of FIG. 1.

Embodiments of the method 300 for visualizing a linear asset on a geospatial context, in accordance with embodiments of the present invention, may begin at step 301 wherein a plurality of metrics of a linear asset is received from an asset management system 110. Step 302 calculates an intermediate point of the linear asset using a geometric analytic tool. Step 303 determines a geospatial length of a linear asset segment using the intermediate point calculated in step 302. Step 304 then displays the linear asset segment in a geospatial context.

Figure 6:
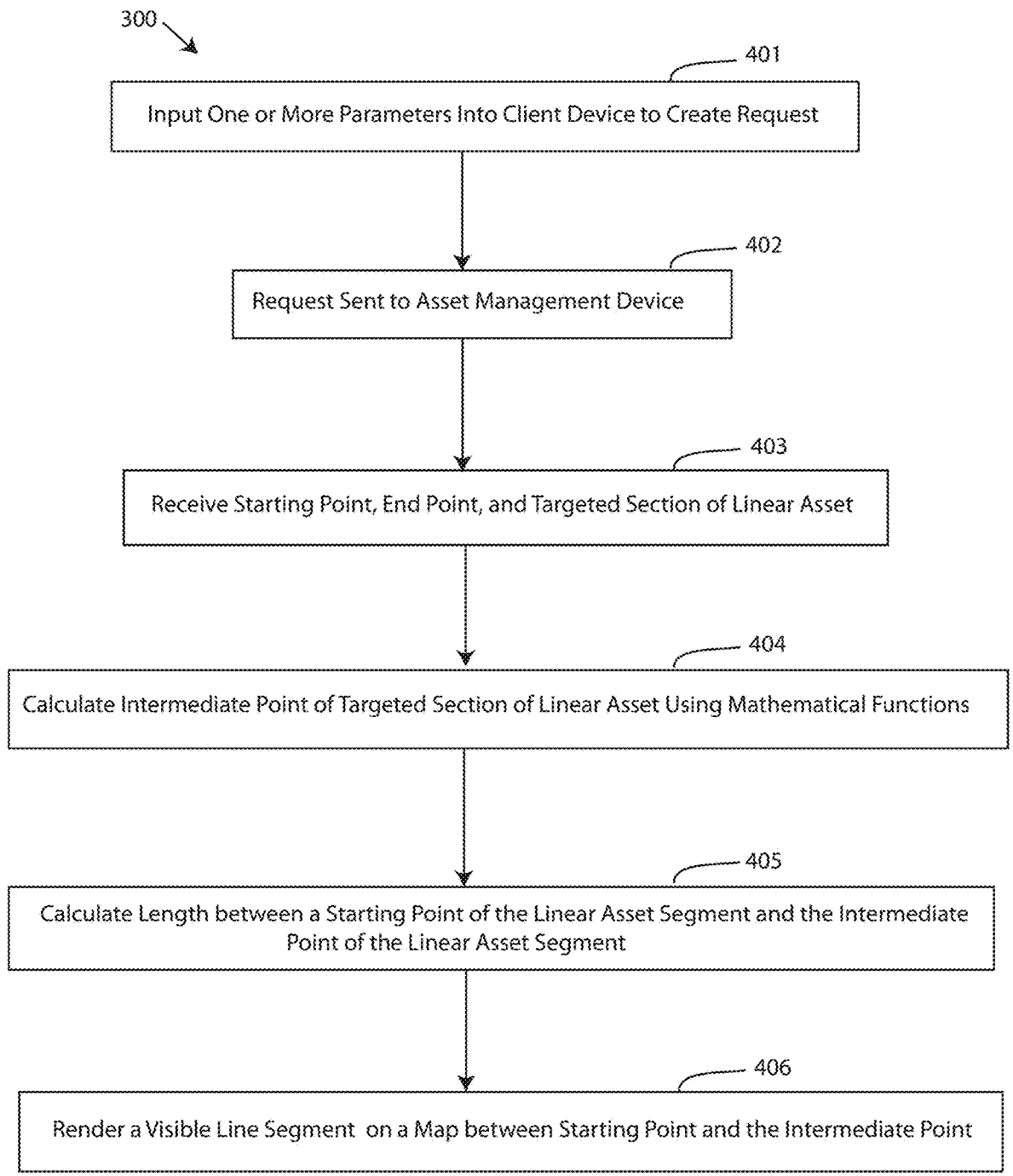
FIG. 6 depicts a detailed flow chart of a method for visualizing a linear asset on a geospatial context, in accordance with embodiments of the present invention.

FIG. 6 depicts a detailed flow chart of a method 300 for visualizing a linear asset on a geospatial context, in accordance with embodiments of the present invention. Embodiments of the method 300 for visualizing a linear asset on a geospatial context may begin at step 401, wherein one or more parameters are input into the client side device to create a request for metric data. For example, the user may touch a location of the display that is currently displaying a map, to indicate a desired starting point of a linear asset for evaluation. The coordinates may then be received by the computing device 120 in response to the request. Further, the user may input an attribute or other parameter, such as a speed limit of a road, to further filter and customize returned metric data. Step 402 sends the request from the computing device 120 to the asset management system 110. Step 403 receives the metric data from the asset management system, such as a starting point, an ending point, an overall length of the linear asset, and a length of a filtered and/or targeted section of the linear asset. Step 404 calculates an intermediate point L(x,y) of the targeted section of the linear asset using mathematical functions, implemented by an analytic tool. Step 405 calculates a length between the starting point P1(x,y) of the linear asset segment and the intermediate point L(x,y) to establish a length and position of the linear asset segment in a geospatial context. Step 406 then renders a visible line segment between the starting point P1(x,y) of the linear asset segment and the intermediate point L(x,y) so that a user may visualize the linear asset.

Figure 7:
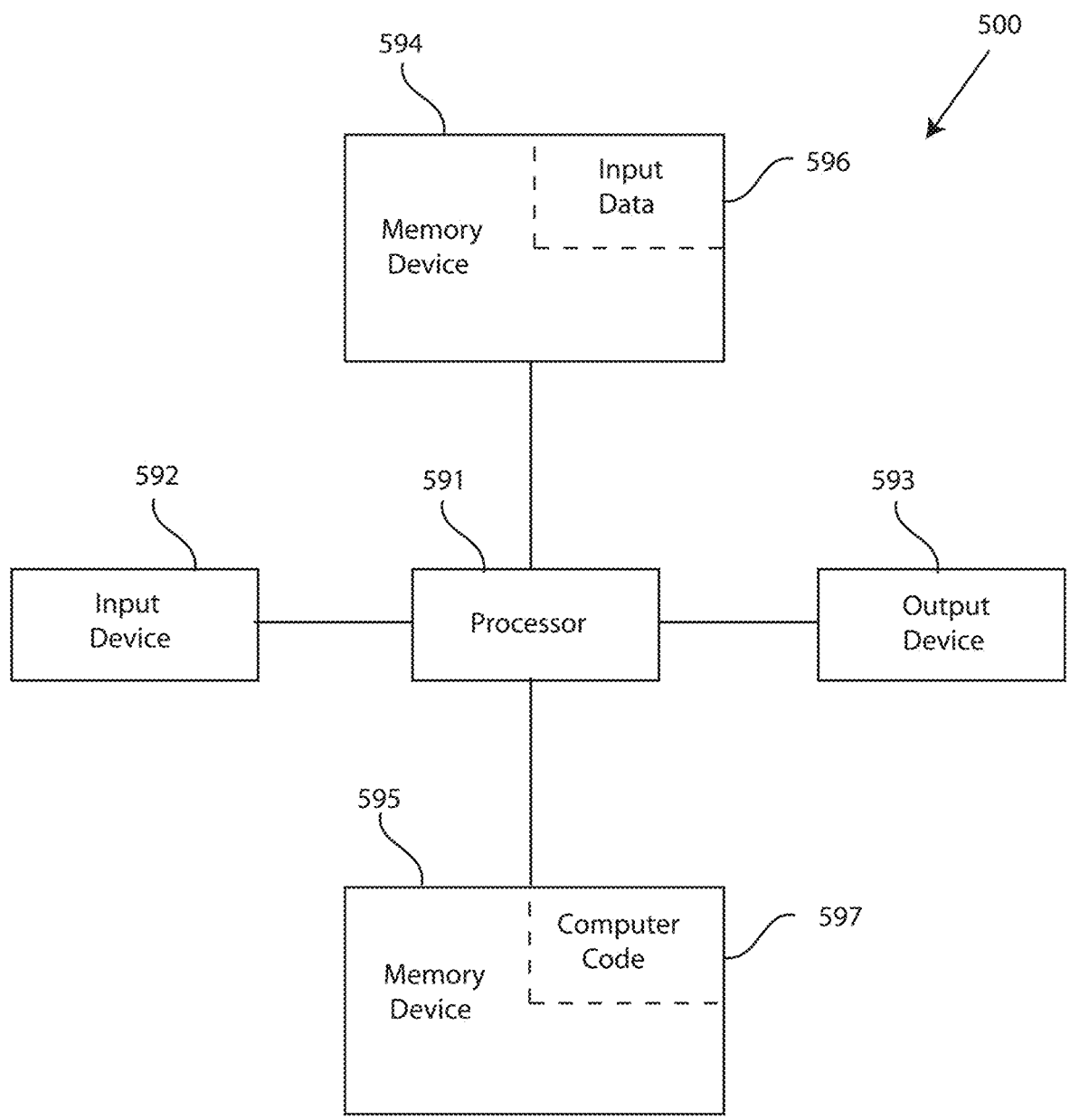
FIG. 7 depicts a block diagram of a computer system for the linear asset processing system of FIGS. 1-4, capable of implementing methods for visualizing a linear asset on a geospatial context of FIGS. 5-6, in accordance with embodiments of the present invention.

FIG. 7 depicts a block diagram of a computer system for the linear asset processing system 100 of FIGS. 1-4, capable of implementing methods for visualizing a linear asset on a geospatial context of FIGS. 5-6, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for visualizing a linear asset on a geospatial context in the manner prescribed by the embodiments of FIGS. 5-6 using the linear asset processing system 100 of FIGS. 1-4, wherein the instructions of the computer code 597 may be executed by processor 591 via memory device 595. The computer code 597 may include software or program instructions that may implement one or more algorithms for implementing the method for visualizing a linear asset on a geospatial context, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN)

or a wide area network (WAN). Further, memory devices 594, 595 may include an operating system (not shown) and may include other systems not shown in FIG. 7.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to linear asset processing and managing systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to display a linear asset on a geospatial context. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a for visualizing a linear asset on a geospatial context. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for visualizing a linear asset on a geospatial context.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method for visualizing a linear asset on a geospatial context, the method comprising:

calculating, by the processor of a client device, an intermediate point of the linear asset on the geospatial context using a geometric analytic tool that analyzes a plurality of metrics received from an asset management system, wherein the linear asset is a physical infrastructure asset having a fixed location in a real-world environment; and displaying, by the processor of the client device, the linear asset segment of the linear asset between a starting point and the intermediate point, on the geospatial context.

2. The method of claim 1, wherein the plurality of metrics include a starting point of the linear asset, an ending point of the linear asset, an overall length of the linear asset, and a targeted section of the linear asset.

3. The method of claim 1, wherein the displaying includes rendering, by the processor of the client device, a line segment between a starting point of the linear asset and the intermediate point on the geospatial context, the geospatial context being a map showing an environment.

4. The method of claim 1, wherein the geospatial length of the linear asset segment is determined using the intermediate point and at least one metric of the plurality of metrics.

5. The method of claim 1, wherein the client device transmits one or more parameters to the asset management system, which returns a targeted section of the linear asset and the plurality of metrics.

6. The method of claim 1, wherein the geometric analytical tool utilizes a plurality of mathematical functions to determine the intermediate point, the intermediate point being defined as a combination of a function of an X axis and a function of a Y axis.

7. The method of claim 6, wherein the plurality of mathematical functions includes:

$L(x)=P1(x)+a'$, wherein a=P2(x)−P1(x)
cos(x)=a/h
a'=cos(x)*m; and $L(y)=P1(y)+b'$, wherein b=P2(y)=P1(y)
sin(x)=b/h
b'=sin(x)*m.

8. A computer system, comprising:
a processor;
a memory device coupled to the processor; and
a computer readable storage device coupled to the processor, wherein the storage device contains program code executable by the processor via the memory device to implement a method for visualizing a linear asset on a geospatial context, the method comprising:
calculating, by the processor of a client device, an intermediate point on the geospatial context using a geometric analytic tool that analyzes a plurality of metrics received from an asset management system, wherein the linear asset is a physical infrastructure asset having a fixed location in a real-world environment; and
displaying, by the processor of the client device, the linear asset segment of the linear asset between a starting point and the intermediate point, on the geospatial context.

9. The computer system of claim 8, wherein the plurality of metrics include a starting point of the linear asset, an ending point of the linear asset, an overall length of the linear asset, and a targeted section of the linear asset.

10. The computer system of claim 8, wherein the displaying includes rendering, by the processor of the client device, a line segment between a starting point of the linear asset and the intermediate point on the geospatial context, the geospatial context being a map showing an environment.

11. The computing system of claim 8, wherein the geospatial length of the linear asset segment is determined using the intermediate point and at least one metric of the plurality of metrics.

12. The computer system of claim 8, wherein the client device transmits one or more parameters to the asset management system, which returns a targeted section of the linear asset and the plurality of metrics.

13. The computer system of claim 8, wherein the geometric analytical tool utilizes a plurality of mathematical functions to determine the intermediate point, the intermediate point being defined as a combination of a function of an X axis and a function of a Y axis.

14. The computer system of claim 13, wherein the plurality of mathematical functions includes:

$L(x)=P1(x)+a'$, wherein a=P2(x)−P1(x)
cos(x)=a/h
a'=cos(x)*m; and $L(y)=P1(y)+b'$, wherein b=P2(y)−P1(y)
sin(x)=b/h
b'=sin(x)*m.

15. A non-transitory computer program product, comprising a computer readable hardware storage device storing a computer readable program code, the computer readable program code comprising an algorithm that when executed by a computer processor of a computing system implements a method for visualizing a linear asset on a geospatial context, the method comprising:
calculating, by the processor of a client device, an intermediate point on the geospatial context using a geometric analytic tool that analyzes a plurality of metrics received from an asset management system, wherein the linear asset is a physical infrastructure asset having a fixed location in a real-world environment; and
displaying, by the processor of the client device, the linear asset segment of the linear asset between a starting point and the intermediate point, on the geospatial context.

16. The computer program product of claim 15, wherein the plurality of metrics include a starting point of the linear asset, an ending point of the linear asset, an overall length of the linear asset, and a targeted section of the linear asset.

17. The computer program product of claim 15, wherein the displaying includes rendering, by the processor of the client device, a line segment between a starting point of the linear asset and the intermediate point on the geospatial context, the geospatial context being a map showing an environment.

18. The computer program product of claim 15, wherein the geospatial length of the linear asset segment is determined using the intermediate point and at least one metric of the plurality of metrics.

19. The computer program product of claim 15, wherein the client device transmits one or more parameters to the asset management system, which returns a targeted section of the linear asset and the plurality of metrics.

20. The computer program product of claim 15, wherein the geometric analytical tool utilizes a plurality of mathematical functions to determine the intermediate point, the intermediate point being defined as a combination of a function of an X axis and a function of a Y axis.

* * * * *